(12) United States Patent
Ahn et al.

(10) Patent No.: US 10,175,823 B2
(45) Date of Patent: Jan. 8, 2019

(54) PANEL-DRIVING DEVICE AND TOUCH-DRIVING DEVICE

(71) Applicant: SILICON WORKS CO., LTD., Daejeon (KR)

(72) Inventors: Yong Sung Ahn, Seoul (KR); Jeong Lee, Seongnam-si (KR); Jun Tak Jeon, Seongnam-si (KR)

(73) Assignee: SILICON WORKS CO., LTD., Daejeon (KR)

( * ) Notice: Subject to any disclaimer, the term of this patent is extended or adjusted under 35 U.S.C. 154(b) by 9 days.

(21) Appl. No.: 15/605,691

(22) Filed: May 25, 2017

(65) Prior Publication Data

US 2017/0351380 A1 Dec. 7, 2017

(30) Foreign Application Priority Data

Jun. 2, 2016 (KR) ........................ 10-2016-0069043

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...... G06F 3/0412; G06F 3/044; G06F 3/0416; G06F 2203/04107
USPC .................................................. 345/173, 174
See application file for complete search history.

(56) References Cited

U.S. PATENT DOCUMENTS

| | | | |
|---|---|---|---|
| 9,348,476 B2 | 5/2016 | Lee | |
| 9,377,915 B2 | 6/2016 | Park et al. | |
| 9,459,717 B2 | 10/2016 | Lee et al. | |
| 2008/0196047 A1* | 8/2008 | Kim | G06F 3/0412 719/323 |
| 2013/0278538 A1* | 10/2013 | Brunet | G06F 3/044 345/174 |
| 2014/0362042 A1* | 12/2014 | Noguchi | G06F 3/0412 345/174 |

* cited by examiner

*Primary Examiner* — Koosha Sharifi-Tafreshi
(74) *Attorney, Agent, or Firm* — Fenwick & West LLP

(57) ABSTRACT

Provided is a technology for generating a sensor-driving waveform using a waveform generator, generating a sensor-driving signal and a sensor-driving auxiliary signal according to the sensor-driving waveform, and providing the same to a sensor electrode and adjacent electrodes.

14 Claims, 12 Drawing Sheets

124

PANEL-DRIVING DEVICE AND TOUCH-DRIVING DEVICE

CROSS REFERENCE TO RELATED APPLICATION

This application claims priority to Korean Patent Application Number 10-2016-0069043 filed on Jun. 2, 2016, which is hereby incorporated by reference for all purposes as if fully set forth herein.

BACKGROUND

1. Field of the Invention

The present invention relates to technology for driving a panel.

2. Description of the Prior Art

Touch-sensing technology is technology for recognizing an object that approaches or is in contact with a touchscreen panel.

It is known that the touchscreen panel is located in the same location as a display panel in a plane. The touchscreen panel is formed to be transparent on the display panel and thus users recognize the display panel and the touchscreen panel as a single panel.

When a touchscreen panel is used, the users generate a user operation signal corresponding to an image while viewing the image output on the panel. Accordingly, users may enjoy intuitiveness compared to other existing input methods, for example, a mouse input method or a keyboard input method.

Because of its advantages, touch-sensing technology has been applied to various electronic devices including the display panel.

Depending on the type of touchscreen panel, the touchscreen panel may be completely separated from the display panel. For example, an add-on-type touchscreen panel is completely separated from the display panel.

Alternatively, the touchscreen panel and the display panel may share some elements. For example, a sensor electrode included in the touchscreen panel may be used as a common electrode of the display panel. An in-cell type touchscreen panel belongs to this case.

Because the touchscreen panel and the display panel are disposed close to each other, capacitive coupling may be formed between a display electrode and a sensor electrode for touch sensing. Such capacitive coupling may be a factor that decreases the sensitivity of touch sensing.

For example, a touch-driving device may recognize a touch using a change in capacitance, which occurs in a sensor electrode upon contact with an object. When capacitive coupling occurs between the sensor electrode and the display electrode, the capacitance variation rate in the sensor electrode decreases, and thus the sensitivity of touch sensing may decrease.

Various electrodes disposed in the display panel, in addition to the display electrode, may form capacitive coupling with the sensor electrode, and such capacitive coupling may be a factor that decreases the sensitivity of touch sensing.

To overcome the problem of capacitive coupling between the sensor electrode and adjacent electrodes, a sensor-driving auxiliary signal, which is similar to a sensor-driving signal provided to the sensor electrode, may be provided to adjacent electrodes.

However, various electrodes are disposed around the sensor electrode. Accordingly, a goal is to realize a method of supplying a sensor-driving auxiliary signal to the various electrodes at the same time. Also, circuit devices related to gate driving operate at a voltage level different from that of the sensor-driving signal, and the circuit devices may malfunction due to the sensor-driving auxiliary signal supplied at the same time, which is undesirable. Also, when a sensor-driving signal is supplied to the sensor electrode, and, at the same time, a sensor-driving auxiliary signal is supplied to the adjacent electrodes, many electrodes in a panel may experience a similar voltage change at the same time, whereby electromagnetic interference (EMI) may increase, which is undesirable.

SUMMARY

In this background, an aspect of the present invention is to provide a technology for supplying a sensor-driving auxiliary signal to electrodes disposed around a sensor electrode at the same time. Another aspect of the present invention is to provide a technology of supplying a sensor-driving auxiliary signal having a voltage level, which is different from that of a sensor-driving signal, to circuit devices related to gate driving. Yet another aspect of the present invention is to provide a technology for minimizing the occurrence of electromagnetic interference (EMI) caused by a sensor-driving signal and a sensor-driving auxiliary signal.

To achieve the above, in accordance with an aspect of the present invention, there is provided a panel-driving device including a plurality of pixels, a plurality of data lines connected to pixels, a plurality of gate lines connected to pixels, and a plurality of sensor electrodes. The panel-driving device includes a waveform generator, a touch-driving circuit, a data-driving circuit, and a coupling circuit.

In the panel-driving device, the waveform generator generates a sensor-driving waveform. The touch-driving circuit generates a sensor-driving signal according to a sensor-driving waveform and supplies the sensor-driving signal to at least one sensor electrode, and generates a first sensor-driving auxiliary signal according to the sensor-driving waveform and supplies the first sensor-driving auxiliary signal to an adjacent sensor electrode of the at least one sensor electrode.

The data-driving circuit generates a second sensor-driving auxiliary signal according to the sensor-driving waveform and supplies the second sensor-driving auxiliary signal to a data line. The coupling circuit generates a third sensor-driving auxiliary signal of which a voltage has a difference of a coupling voltage from a voltage of the sensor-driving waveform, and supplies the third sensor-driving auxiliary signal to a gate-driving circuit that drives a gate line.

In accordance with another aspect of the present invention, there is provided a touch-driving device that includes a waveform generator, a touch-sensing circuit, and a signal transfer circuit.

In the touch-driving device, the waveform generator generates a sensor-driving waveform of which a slope of each of a rising edge and a falling edge has a value that is less than or equal to a predetermined value.

The touch-sensing circuit generates a sensor-driving signal according to the sensor-driving waveform, and supplies the sensor-driving signal to at least one sensor electrode out of a plurality of sensor electrodes disposed on a panel.

The signal transfer circuit supplies a sensor-driving auxiliary signal, generated according to the sensor-driving waveform, to an adjacent sensor electrode of the at least one sensor electrode.

In accordance with another aspect of the present invention, there is provided a panel-driving device including a plurality of pixels, a plurality of data lines connected to pixels, a plurality of gate lines connected to pixels, and a plurality of sensor electrodes. The panel-driving device includes a waveform generator, a touch-driving circuit, a data-driving circuit, an auxiliary waveform generator, and a gate-driving circuit.

In the panel-driving device, the waveform generator generates a sensor-driving waveform. The touch-driving circuit generates a sensor-driving signal according to a sensor-driving waveform and supplies the sensor-driving signal to at least one sensor electrode, and generates a first sensor-driving auxiliary signal according to the sensor-driving waveform and supplies the first sensor-driving auxiliary signal to an adjacent sensor electrode of the at least one sensor electrode.

The data-driving circuit generates a second sensor-driving auxiliary signal according to the sensor-driving waveform and supplies the second sensor-driving auxiliary signal to a data line.

The auxiliary waveform generator generates a third sensor-driving auxiliary signal having a voltage that has a difference of a predetermined voltage from a voltage of the sensor-driving waveform, and the gate-driving circuit supplies the third sensor-driving auxiliary signal to a gate line.

As described above, according to the present invention, a sensor-driving auxiliary signal may be supplied to electrodes disposed around a sensor electrode at the same time. Also, according to the present invention, a sensor-driving auxiliary signal, which has a voltage level different from that of a sensor-driving signal, may be supplied to circuit devices related to gate driving. Also, according to the present invention, the occurrence of electromagnetic interference (EMI) caused by a sensor-driving signal and a sensor-driving auxiliary signal may be minimized.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
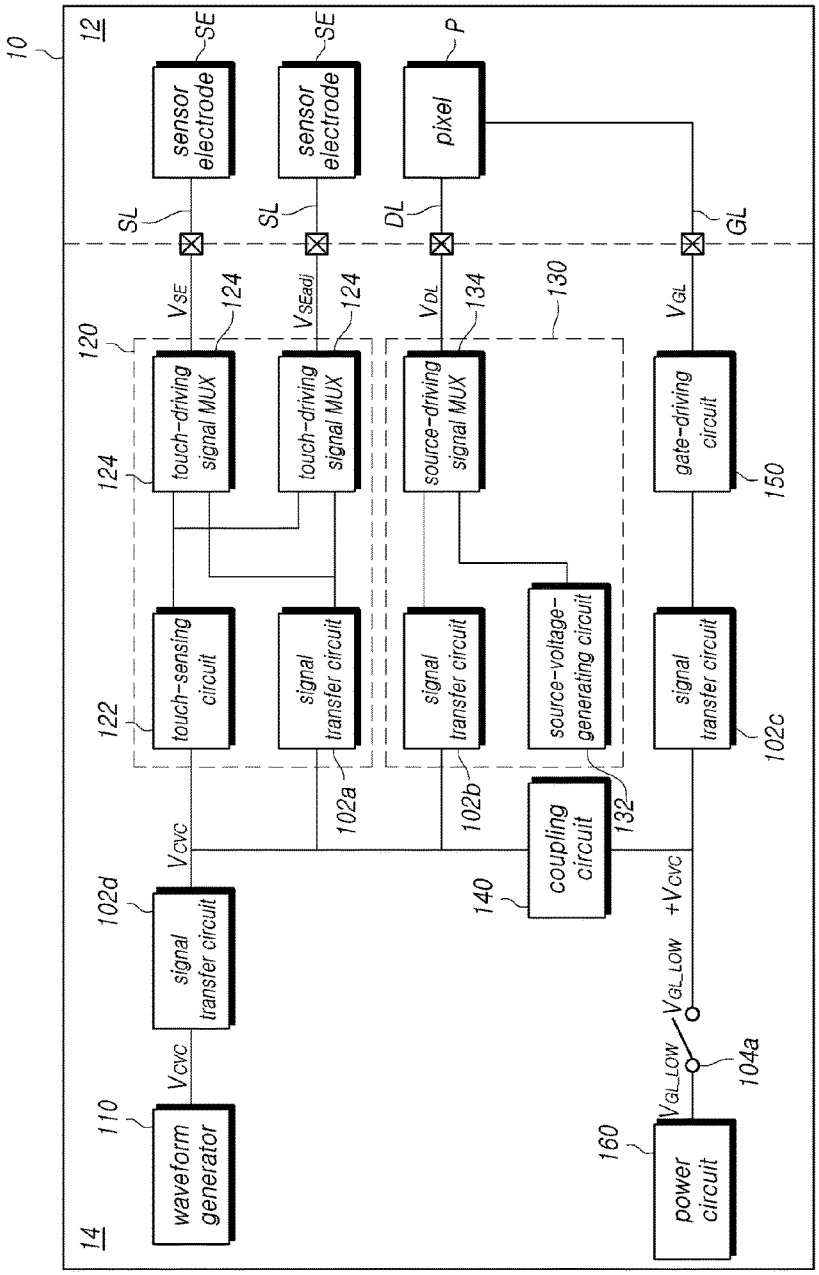
FIG. 1 is a block diagram schematically illustrating the configuration of a display device according to an embodiment.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram schematically illustrating the configuration of a display device according to an embodiment.

Referring to FIG. 1, a display device 10 may include a panel 12 and a panel-driving device 14.

A plurality of data lines DL connected with a data-driving circuit 130 and a plurality of gate lines GL connected with a gate-driving circuit 150 may be formed in the panel 12. In the panel 12, a plurality of pixels P may be defined at intersections between the plurality of data lines DL and the plurality of gate lines GL.

At each pixel P, a transistor may be formed, where a first electrode (e.g. a source electrode or a drain electrode) is connected with a data line DL, a gate electrode is connected with a gate line GL, and a second electrode (e.g. a drain electrode or a source electrode) is connected with a display electrode. When the transistor is turned on, the display electrode may be connected with the data line DL. Turning on/off the transistor may be determined by a gate-driving signal supplied to the gate line GL. When the gate-driving signal is a gate low voltage, the transistor is turned off. Then, the connection between the data line DL and the display electrode may be released.

A plurality of sensor electrodes (SE) may be formed to be spaced apart from one another in the panel 12. In an area where a sensor electrode SE is disposed, a single pixel P or a plurality of pixels P may be disposed.

The panel 12 may include a display panel and a touch-screen panel (TSP). Here, the display panel and the touch-screen panel may share some elements. For example, a plurality of sensor electrodes SE may be one element (e.g., a common electrode applying a common voltage) of the display panel, and at the same time, may be one element (e.g., a sensor electrode for sensing a touch) of the touchscreen panel. In view of the fact that the display panel and the touchscreen panel share some elements, the panel 12 is called an integrated-type panel. However, the present invention is not limited thereto. An in-cell type panel is known as a panel in which a display panel and a touchscreen panel share some elements. However, the in-cell type panel is merely an example of the above-described panel 12, and a panel according to the present invention is not limited to the in-cell type panel.

The panel-driving device 14 may include a touch-driving circuit 120, a data-driving circuit 130, a gate-driving circuit 150, a power circuit 160, and the like.

The data-driving circuit 130 may supply a data signal to a data line DL to display a digital image in each pixel P of the panel 12.

The data-driving circuit 130 may include at least one data driver integrated circuit (IC). The at least one data driver IC may be connected to a bonding pad of the panel 12 based on a Tape-Automated-Bonding (TAB) scheme or a Chip-On-Glass (COG) scheme, or may be directly formed in the panel 12. Depending on the case, the at least one driver IC may be integrated and formed in the panel 12. Also, the data-driving circuit 130 may be embodied as a chip-on-film (COF).

The gate-driving circuit 150 may sequentially supply a gate-driving signal to a gate line GL to turn on or off a transistor disposed at each pixel P.

Also, the gate-driving circuit 150 may include at least one gate driver IC. The at least one gate driver IC may be connected with a bonding pad of the panel 12 based on the TAB scheme or the COG scheme, or may be embodied as a Gate-In-Panel (GIP) type and may be directly formed in the panel 12. Depending on the case, the at least one gate driver IC may be integrated and formed in the panel 12. Also, the gate-driving circuit 150 may be embodied as a chip-on-film (COF).

The touch-driving circuit 120 may provide a sensor-driving signal $V_{SE}$ to some or all of the plurality of sensor electrodes SE connected with a sensing line SL.

The touch-driving circuit 120 is an element separated from the data-driving circuit 130 and the gate-driving circuit 150, as illustrated in FIG. 1. The touch-driving circuit 120 may be disposed outside the data-driving circuit 130 and the gate-driving circuit 150. Depending on the case, the touch-driving circuit 120 may be embodied as an internal element of another separate driver IC including at least one of the data-driving circuit 130 and the gate-driving circuit 150, or may be embodied as an internal element of the data-driving circuit 130 or the gate-driving circuit 150.

Therefore, providing a sensor-driving signal $V_{SE}$ to some or all of the plurality of sensor electrodes (SE) by the touch-driving circuit 120 may also be construed as providing a sensor-driving signal $V_{SE}$ to some or all of the plurality of sensor electrodes (SE) by a separate driver IC including the touch-driving circuit 120. Also, depending on the design, this may be construed as providing a sensor-driving signal $V_{SE}$ to some or all of the plurality of sensor electrodes (SE) by the data-driving circuit 130 or the gate-driving circuit 150 including the touch-driving circuit 120.

The touch-driving circuit 120 is not limited to the embodiment and design. Only when a configuration has execution functions identical or similar to those of the touch-driving circuit 120 described in this specification may the configuration itself, or another configuration existing inside or outside the configuration be used.

A sensing line SL connected to each of the plurality of sensor electrodes (SE) is needed for the touch-driving circuit 120 to provide a sensor-driving signal $V_{SE}$ to all or some of the plurality of sensor electrodes SE. Accordingly, a sensing line SL, which is connected to each of the plurality of sensor electrodes SE and delivers a sensor-driving signal $V_{SE}$, may be formed in the panel 12 in a first direction (e.g., the vertical direction) or a second direction (e.g., the horizontal direction).

The display device 10 may employ a capacitive touch scheme that recognizes proximity or a touch by an object by sensing a change in capacitance through a sensor electrode SE.

The capacitive touch scheme may be classified as, for example, a mutual-capacitive touch scheme and a self-capacitive touch scheme.

The mutual-capacitive touch scheme, which is one of several available capacitive touch schemes, provides a sensor-driving signal $V_{SE}$ to one sensor electrode (Tx electrode), and senses another sensor electrode (Rx electrode) that is mutually coupled to the Tx electrode. In the mutual-capacitive touch scheme, the value sensed in the Rx electrode may change based on proximity or a touch by an object, such as a finger, a pen, or the like. The mutual-capacitive touch scheme detects whether a touch occurs, the touch coordinates, and the like based on a sensing value at the Rx electrode.

The self-capacitive touch scheme, which is another one of the available capacitive touch schemes, provides a sensor-driving signal $V_{SE}$ to one sensor electrode SE and senses the corresponding sensor electrode SE. In the self-capacitive touch scheme, a value sensed in one sensor electrode SE may change based on proximity or a touch by an object, such as a finger, a pen, or the like. The self-capacitive touch scheme detects whether a touch occurs, the touch coordinates, and the like based on the sensing value. In the self-capacitive touch scheme, the sensor electrode SE to which a sensor-driving signal $V_{SE}$ is provided and the sensor electrode SE where sensing is performed are the same, and thus a Tx electrode and an Rx electrode may not be distinguished.

The display device 10 may employ one of the two above-described capacitive touch schemes (the mutual-capacitive touch scheme and the self-capacitive touch scheme).

The panel-driving device 14 may further include a waveform generator 110, a coupling circuit 140, a power circuit 160, and the like.

The waveform generator 110 may generate a sensor-driving waveform $V_{CVC}$. A sensor-driving waveform $V_{CVC}$ generated in the waveform generator 110 may be delivered to the touch-driving circuit 120, the data-driving circuit 130, and the coupling circuit 140.

The touch-driving circuit 120 may generate a sensor-driving signal $V_{SE}$ according to the sensor-driving waveform $V_{CVC}$. The touch-driving circuit 120 may generate a sensor-driving signal $V_{SE}$ using a sensor-driving waveform $V_{CVC}$ as a reference signal. In this instance, the sensor-driving waveform $V_{CVC}$ and the sensor-driving signal $V_{SE}$ may have substantially the same phase and the same voltage magnitude. The touch-driving circuit 120 may generate a first sensor-driving auxiliary signal ($V_{SEadj}$) according to a sensor-driving waveform $V_{CVC}$.

The touch-driving circuit 120 may supply a sensor-driving signal $V_{SE}$ to a sensor electrode SE with respect to which sensing is to be performed. The touch-driving circuit 120 may supply a first sensor-driving auxiliary signal $V_{SEadj}$ to an adjacent sensor electrode SE of a sensor electrode SE with respect to which sensing is to be performed.

The touch-driving circuit 120 may internally include a touch-sensing circuit 122, a touch-driving signal MUX 124, and the like.

The touch-sensing circuit 122 may generate a sensor-driving signal $V_{SE}$ according to a sensor-driving waveform $V_{CVC}$, and may supply the sensor-driving signal $V_{SE}$ to the sensor electrode SE with respect to which sensing is to be performed.

The touch-driving signal MUX 124 may select one of a plurality of signals and may deliver the selected signal to a sensor electrode SE. In this instance, the touch-driving signal MUX 124 may deliver one of a sensor-driving signal $V_{SE}$ and a first sensor-driving auxiliary signal $V_{SEadj}$ to the sensor electrode SE. According to an embodiment, the touch-driving signal MUX 124 may selectively output one of a sensor-driving signal $V_{SE}$, a first sensor-driving auxiliary signal $V_{SEadj}$, and a DC voltage to a sensor electrode SE.

The touch-driving circuit 120 may further include a signal transfer circuit 102a. The signal transfer circuit 102a is a circuit for outputting a signal having a waveform that is substantially the same as that of an input signal.

The signal transfer circuit 102a included in the touch-driving circuit 120 may receive a sensor-driving waveform $V_{CVC}$ as an input and may output a first sensor-driving auxiliary signal $V_{SEadj}$ having the same waveform as the sensor-driving waveform $V_{CVC}$.

The touch-driving signal MUX 124 is connected to the touch-sensing circuit 122 and the signal transfer circuit 102, and may output a sensor-driving signal $V_{SE}$ or a first sensor-driving auxiliary signal $V_{SEadj}$ to a sensor electrode SE in response to control.

The data-driving circuit 130 may generate a second sensor-driving auxiliary signal $V_{DL}$ according to a sensor-driving waveform $V_{CVC}$ generated in the waveform generator 110, and may supply the second sensor-driving auxiliary signal $V_{DL}$ to a data line DL.

The data-driving circuit 130 may internally include a signal transfer circuit 102b, a source-voltage-generating circuit 132, a source-driving signal MUX 134, and the like.

The signal transfer circuit 102b included in the data-driving circuit 130 may receive a sensor-driving waveform $V_{CVC}$ as an input, and may output a second sensor-driving auxiliary signal $V_{DL}$ having the same waveform as the sensor-driving waveform $V_{CVC}$.

The source-voltage-generating circuit 132 may generate a data signal to be supplied to each pixel P according to image data.

The source-driving signal MUX 134 may be connected to the signal transfer circuit 102b and the source-voltage-generating circuit 132, and may output a second sensor-driving auxiliary signal $V_{DL}$ or a data signal to a data line DL in response to control.

The coupling circuit 140 may generate a third sensor-driving auxiliary signal $V_{GL}$ of which a voltage has a difference of a coupling voltage from that of the sensor-driving waveform $V_{CVC}$. The third sensor-driving auxiliary signal $V_{GL}$ may be supplied to the gate-driving circuit 150 that drives a gate line GL. The gate-driving circuit 150 may supply the third sensor-driving auxiliary signal $V_{GL}$ to the gate line GL.

A voltage having a sensor-driving waveform $V_{CVC}$ may be connected to one side of the coupling circuit 140, and a gate low voltage $V_{GL\_LOW}$ may be connected to the other side. Here, the gate low voltage $V_{GL\_LOW}$ may be a voltage supplied to a pixel P to release a connection between a data line DL and a display electrode. A transistor is disposed at a pixel P, and when a gate low voltage $V_{GL\_LOW}$ is supplied to a gate of the transistor, a connection between a data line DL and a display electrode may be released.

The gate low voltage $V_{GL\_LOW}$ is not always connected to the coupling circuit 140. The gate low voltage $V_{GL\_LOW}$ may be connected to or disconnected from the coupling circuit 140 depending on the control mode. As an example, the gate low voltage $V_{GL\_LOW}$ may be connected to the other side of the coupling circuit 140 in a display mode, and the connection may be released in a touch mode. Here, the display mode is a mode in which control is performed to supply a data signal to a pixel P. The touch mode is a mode in which control is performed to sense a touch in a sensor electrode SE. A single pixel P may be controlled based on the display mode or the touch mode.

The gate low voltage $V_{GL\_LOW}$ may be generated in the power circuit 160.

The power circuit 160 may be connected to the other side of the coupling circuit 140 through a switch 104a. The switch 104a is closed in the display mode to connect the power circuit 160 and the coupling circuit 140, and is open in the touch mode to disconnect the power circuit 160 from the coupling circuit 140.

In the display mode, a sensor-driving waveform $V_{CVC}$ may be connected to one side of the coupling circuit 140 and a gate low voltage $V_{GL\_LOW}$ may be connected to the other side. When the sensor-driving waveform $V_{CVC}$ maintains a predetermined voltage (e.g., a ground voltage) in the display mode, a coupling voltage (e.g., a gate low voltage) may be formed in both ends of the coupling circuit 140.

When the switch 104a is open and maintains a coupling voltage with the coupling circuit 140 in the touch mode, a third sensor-driving auxiliary signal $V_{GL}$, in which a sensor-driving waveform $V_{CVC}$ is added to the coupling voltage, is generated in the other side of the coupling circuit 140.

When the third sensor-driving auxiliary signal $V_{GL}$ is delivered from the coupling circuit 140 to the gate-driving circuit 150, the third sensor-driving auxiliary signal $V_{GL}$ may be delivered through a signal transfer circuit 102c. Also, when a signal is output from the waveform generator 110, the signal may pass through a signal transfer circuit 102d.

When a sensor-driving signal $V_{SE}$ is supplied to a sensor electrode SE, a first sensor-driving auxiliary signal $V_{SEadj}$ is supplied to an adjacent sensor electrode SE, a second sensor-driving auxiliary signal $V_{DL}$ is supplied to a data line DL, and a third sensor-driving auxiliary signal $V_{GL}$ is supplied to a gate line GL. When a sensor-driving auxiliary signal is supplied to adjacent electrodes of a sensor electrode SE with respect to which sensing is to be performed, the base capacitance of the sensor electrode SE may be decreased and touch sensitivity may be increased. This effect will be described with reference to FIGS. 2 to 4.

Figure 2:
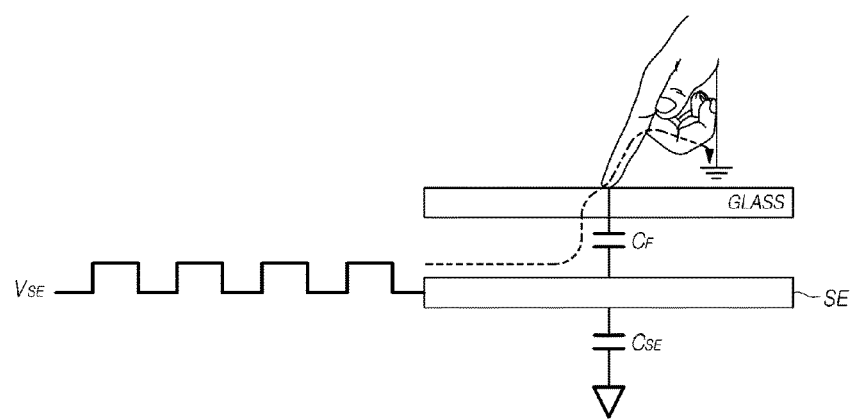
FIG. 2 is a diagram illustrating a capacitive touch-sensing scheme according to an embodiment.

FIG. 2 is a diagram illustrating a capacitive touch-sensing scheme according to an embodiment.

Referring to FIG. 2, according to a capacitive touch-sensing scheme, a touch-driving circuit supplies a sensor-driving signal $V_{SE}$ to a sensor electrode SE. The touch-driving circuit senses the capacitance of a sensor electrode SE using a reaction signal with respect to a sensor-driving signal $V_{SE}$.

In a situation in which an object, such as a finger, is not present, a base capacitance $C_{SE}$ of a sensor electrode SE may be sensed. When an object approaches the sensor electrode SE, an object capacitance $C_F$ is additionally recognized. In this instance, the ratio of the object capacitance $C_F$ to the base capacitance $C_{SE}$ may affect the touch sensitivity.

Figure 3:
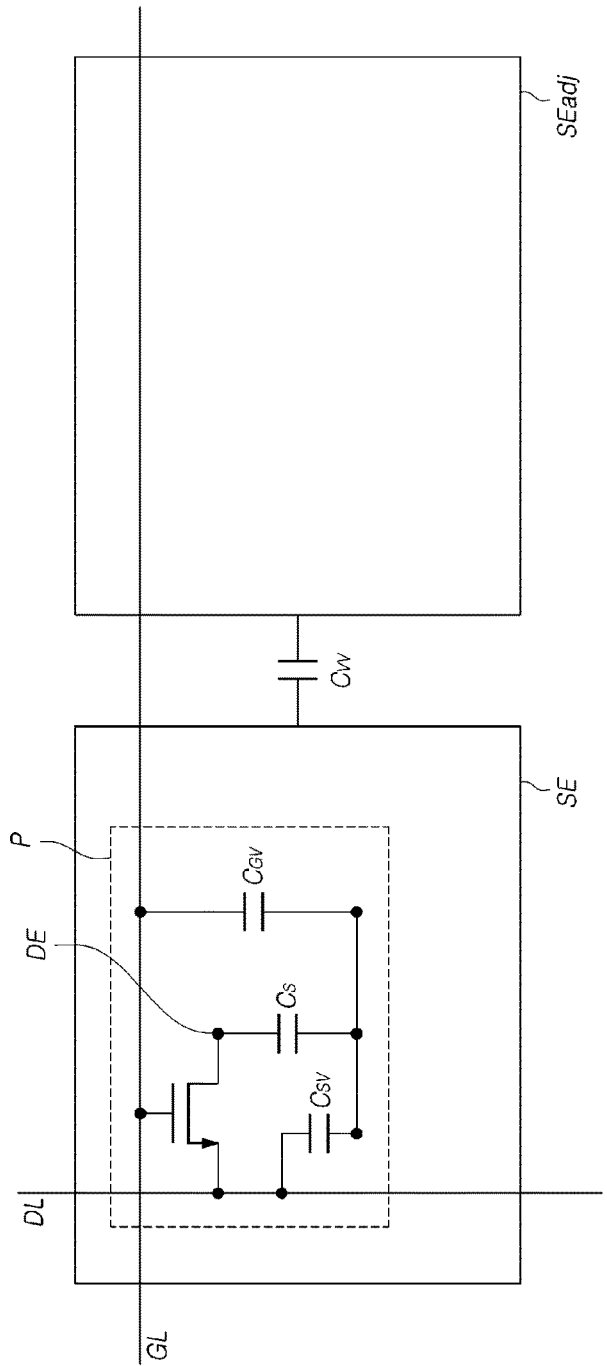
FIG. 3 is a diagram illustrating a parasitic capacitance formed between a sensor electrode and adjacent electrodes according to an embodiment.

FIG. 3 is a diagram illustrating a parasitic capacitance formed between a sensor electrode and adjacent electrodes according to an embodiment.

Referring to FIG. 3, a parasitic capacitance $C_{SV}$ is formed between a sensor electrode SE and a data line DL. A parasitic capacitance $C_{GV}$ is formed between a sensor electrode SE and a gate line GL. A parasitic capacitance $C_S$ is formed between a sensor electrode SE and a display electrode DE. A parasitic capacitance $C_{VV}$ is formed between a sensor electrode SE and an adjacent sensor electrode $SE_{adj}$. The parasitic capacitances $C_{SV}$, $C_{GV}$, $C_S$, and $C_{VV}$ may affect an increase in the magnitude of the base capacitance ($C_{SE}$ of FIG. 2), which has been described with reference to FIG. 2.

To minimize the effect of the parasitic capacitances $C_{SV}$, $C_{GV}$, $C_S$, and $C_{VV}$, a panel-driving device may supply a sensor-driving auxiliary signal to adjacent electrodes of a sensor electrode SE.

Figure 4:
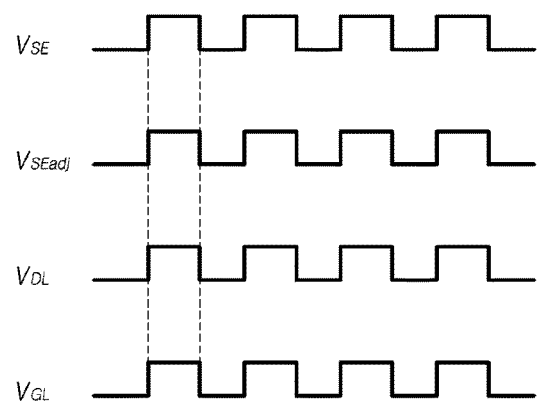
FIG. 4 is a diagram illustrating waveforms of a sensor-driving signal and sensor-driving auxiliary signals.

FIG. 4 is a diagram illustrating waveforms of a sensor-driving signal and sensor-driving auxiliary signals.

Referring to FIG. 4, a sensor-driving signal $V_{SE}$, a first sensor-driving auxiliary signal $V_{SEadj}$, a second sensor-driving auxiliary signal $V_{DL}$, and a third sensor-driving auxiliary signal $V_{GL}$ may have substantially the same phase. The phase of each signal $V_{SE}$, $V_{SEadj}$, $V_{DL}$, and $V_{GL}$ may be controlled to optimize touch performance.

In the case in a change does not occur in both ends of a capacitor, it is recognized that the capacitor does not exist and disconnection occurs. A panel-driving device supplies a sensor-driving signal $V_{SE}$ to a sensor electrode SE, and supplies a first sensor-driving auxiliary signal $V_{SEadj}$, a second sensor-driving auxiliary signal $V_{DL}$, and a third sensor-driving auxiliary signal $V_{GL}$, which have the same phase as the sensor-driving signal $V_{SE}$, to adjacent electrodes, thereby eliminating parasitic capacitance between the sensor electrode SE and the adjacent electrodes.

The panel-driving device according to an embodiment generates a sensor-driving signal $V_{SE}$, a first sensor-driving auxiliary signal $V_{SEadj}$, a second sensor-driving auxiliary signal $V_{DL}$, and a third sensor-driving auxiliary signal $V_{GL}$ according to a sensor-driving waveform generated by a single waveform generator, as described with reference to FIG. 1, and thus, may maintain the relationship with the sensor-driving signal $V_{SE}$, the first sensor-driving auxiliary signal $V_{SEadj}$, the second sensor-driving auxiliary signal $V_{DL}$, and the third sensor-driving auxiliary signal $V_{GL}$ constant, irrespective of surrounding circumstances (temperature), the production conditions of a product, and the like.

Unlike the embodiment, when a touch-driving circuit, a data-driving circuit, and the like separately generate a sensor-driving auxiliary signal, the waveform of a sensor-driving auxiliary signal changes according to the difference in operating temperature between the touch-driving circuit and the data-driving circuit, the production conditions of each circuit, and the like, and thus, parasitic capacitance may not be effectively removed.

When the sensor-driving signal $V_{SE}$, the first sensor-driving auxiliary signal $V_{SEadj}$, the second sensor-driving auxiliary signal $V_{DL}$, and the third sensor-driving auxiliary signal $V_{GL}$ are synchronized and operate, the parasitic capacitance may be effectively removed. However, when various signals are synchronized and operate, an electromagnetic wave interference (EMI) signal increases, which is undesirable. Particularly, when many signals in the form of a pulse, as illustrated in FIG. 4, are generated at the same time, an EMI signal of a high-frequency component increases further.

To decrease the EMI signal, a waveform generator according to an embodiment may generate a sensor-driving waveform in the form of a trapezoid.

Figure 5:
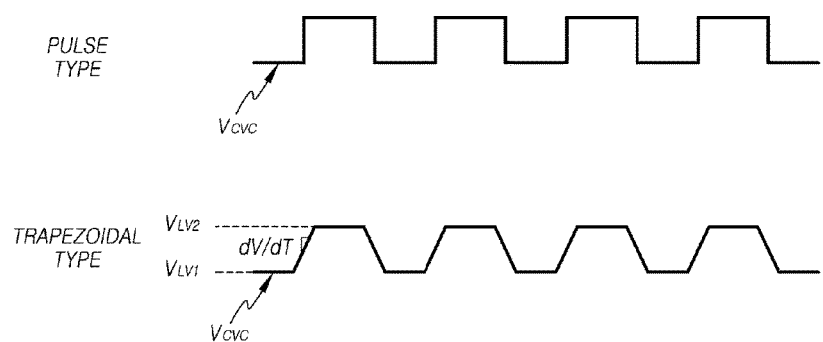
FIG. 5 is a diagram illustrating an example of a sensor-driving waveform generated by a waveform generator according to an embodiment.

FIG. 5 is a diagram illustrating an example of a sensor-driving waveform generated by a waveform generator according to an embodiment.

A sensor-driving waveform $V_{CVC}$ may be a pulse type. Depending on an embodiment, the sensor-driving waveform $V_{CVC}$ may be a trapezoidal type.

When the sensor-driving waveform $V_{CVC}$ is a trapezoid waveform, the sensor-driving waveform $V_{CVC}$ may be changed to a first level voltage $V_{LV1}$ and a second level voltage $V_{LV2}$. When the sensor-driving waveform $V_{CVC}$ is changed from the first level voltage $V_{LV1}$ to the second level voltage $V_{LV2}$, a voltage variation rate per unit time (dV/dT) may have a predetermined value.

In the sensor-driving waveform $V_{CVC}$, as the voltage variation rate per unit time (dV/dT) becomes lower, a high-frequency EMI signal and a peak EMI signal become lower. When the sensor-driving waveform $V_{CVC}$ is a pulse type, the voltage variation rate per unit time (dV/dT) is significantly high, and thus a high-frequency EMI signal is generated to be high.

In the sensor-driving waveform $V_{CVC}$, a frequency band in which EMI frequently occurs may change based on the voltage variation rate per unit time (dV/dT). When an EMI exceeds a restriction in a predetermined frequency band, an engineer may control the voltage variation rate per unit time (dV/dT) in a sensor-driving waveform $V_{CVC}$, thereby reducing the magnitude of an EMI signal that exceeds the restriction in the frequency band. To allow the engineer to perform the above operation, a waveform generator according to an embodiment may include configurations that are capable of controlling a voltage variation rate per unit time (dV/dT), and the magnitude of a first level voltage $V_{LV1}$ and a second level voltage $V_{LV2}$ in association with a sensor-driving waveform $V_{CVC}$.

Figure 6:
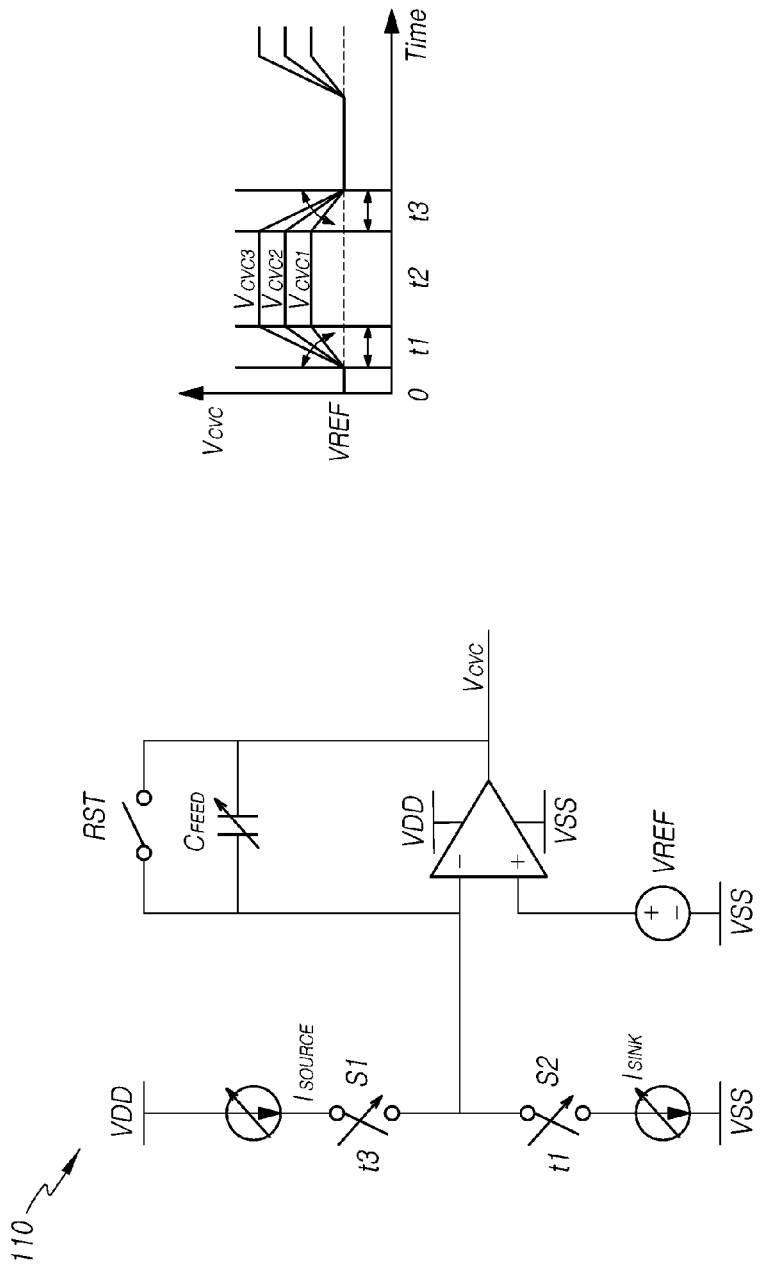
FIG. 6 is a diagram illustrating a waveform generator according to an embodiment.

FIG. 6 is a diagram illustrating a waveform generator according to an embodiment.

Referring to FIG. 6, the waveform generator 110 may include a first current source $I_{SOURCE}$, a second current source $I_{SINK}$, and an output capacitor $C_{FEED}$.

The first current source $I_{SOURCE}$ may supply a current to the output capacitor $C_{FEED}$ to enable the voltage of the output capacitor $C_{FEED}$ to decrease at a predetermined slope.

The second current source $I_{SINK}$ may sink a current from the output capacitor $C_{FEED}$ to enable a voltage of the output capacitor $C_{FEED}$ to increase at a predetermined slope.

The waveform generator 110 may generate a sensor-driving waveform $V_{CVC}$ in the form of a trapezoid by increasing the voltage of the output capacitor $C_{FEED}$ using the second current source $I_{SINK}$ for a first time duration t1, maintaining the voltage of the output capacitor $C_{FEED}$ for a second time duration t2, and decreasing the voltage of the output capacitor $C_{FEED}$ using the first current source $I_{SOURCE}$ for a third time duration t3.

The first current source $I_{SOURCE}$ and the second current source $I_{SINK}$ may be a current source (e.g., a programmable current source) that is capable of controlling the magnitude of an output current or a sink current.

The waveform generator 110 may control the magnitude of an output current of the first current source $I_{SOURCE}$, thereby controlling the slope of a falling edge of a sensor-driving waveform $V_{CVC}$. Also, through the above, the waveform generator 110 may generate the slope of the falling edge of the sensor-driving waveform $V_{CVC}$ to be a value less than or equal to a predetermined value.

The waveform generator 110 may control the magnitude of a sink current of the second current source ($I_{SINK}$), thereby controlling the slope of a rising edge of a sensor-driving waveform $V_{CVC}$. Also, through the above, the waveform generator 110 may generate the slope (slope absolute value) of the rising edge of the sensor-driving waveform $V_{CVC}$ so as to have a value less than or equal to a predetermined value.

The output capacitor $C_{FEED}$ may be a variable capacitor. The waveform generator 110 may control the capacitance of the output capacitor $C_{FEED}$, thereby controlling the slopes of the rising edge and the falling edge of a sensor-driving waveform $V_{CVC}$.

The waveform generator 110 may control the lengths of the first time duration t1 and the third time duration t3, thereby controlling the magnitude of voltage variation of a sensor-driving waveform $V_{CVC}$.

Also, the waveform generator 110 may maintain the lengths of the first time duration t1 and the third time duration t3, and may control the magnitude of an input/output current of the first current source $I_{SOURCE}$ and the second current source $I_{SINK}$, thereby controlling the magnitude of voltage variation of a sensor-driving waveform $V_{CVC}$.

The sensor-driving waveform $V_{CVC}$ maintains a predetermined voltage VREF, and increases at a predetermined slope when a current is sunk to the output capacitor $C_{FEED}$ from the second current source $I_{SINK}$. When the length of the first time duration t1 is constant, the magnitude of voltage variation of the output capacitor $C_{FEED}$ is determined based on the magnitude of the current sunk from the second current source $I_{SINK}$. The magnitude of voltage variation of the output capacitor $C_{FEED}$ may be changed to $V_{CVC1}$, $V_{CVC2}$, $V_{CVC3}$, or the like depending on the magnitude of a current supplied from the first current source $I_{SOURCE}$ and the second current source, as illustrated in FIG. 6.

Referring to the connection relationship between the first current source $I_{SOURCE}$, the second current source $I_{SINK}$, and the output capacitor $C_{FEED}$, the first current source $I_{SOURCE}$ is connected to a high voltage source VDD and the second current source $I_{SINK}$ may be connected to a low voltage source VSS.

The output capacitor $C_{FEED}$ connects a negative input device to an output device of an amplifier, and a predetermined voltage VREF indicating a reference voltage (a low voltage level or a high voltage level) of a sensor-driving waveform $V_{CVC}$ may be connected to a positive input device of the amplifier. As the occasion demands, to discharge the output capacitor $C_{FEED}$, a reset switch RST and the output capacitor $C_{FEED}$ may be connected in parallel. In the embodiment, a sensor-driving waveform $V_{CVC}$ may be formed in the output device of the amplifier.

The first current source $I_{SOURCE}$ and the second current source $I_{SINK}$ may be connected with the negative input device via respective switches S1 and S2.

The waveform generator 110 may control the on time of the switches S1 and S2, thereby controlling the magnitude of voltage variation of a sensor-driving waveform $V_{CVC}$. For example, the waveform generator 110 may control the magnitude of voltage variation of a sensor-driving waveform $V_{CVC}$ by turning on the first switch S1 for the first time duration t1, and turning on the second switch S2 for the third time duration t3.

Figure 7A:
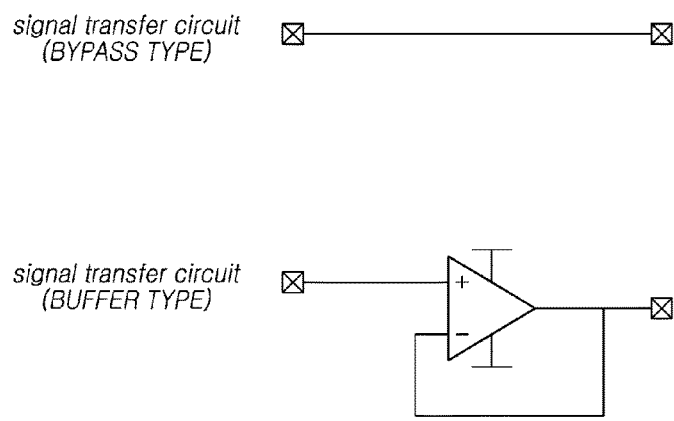
FIGS. 7A and 7B are diagrams illustrating examples of a signal transfer circuit according to an embodiment.
Figure 7B:
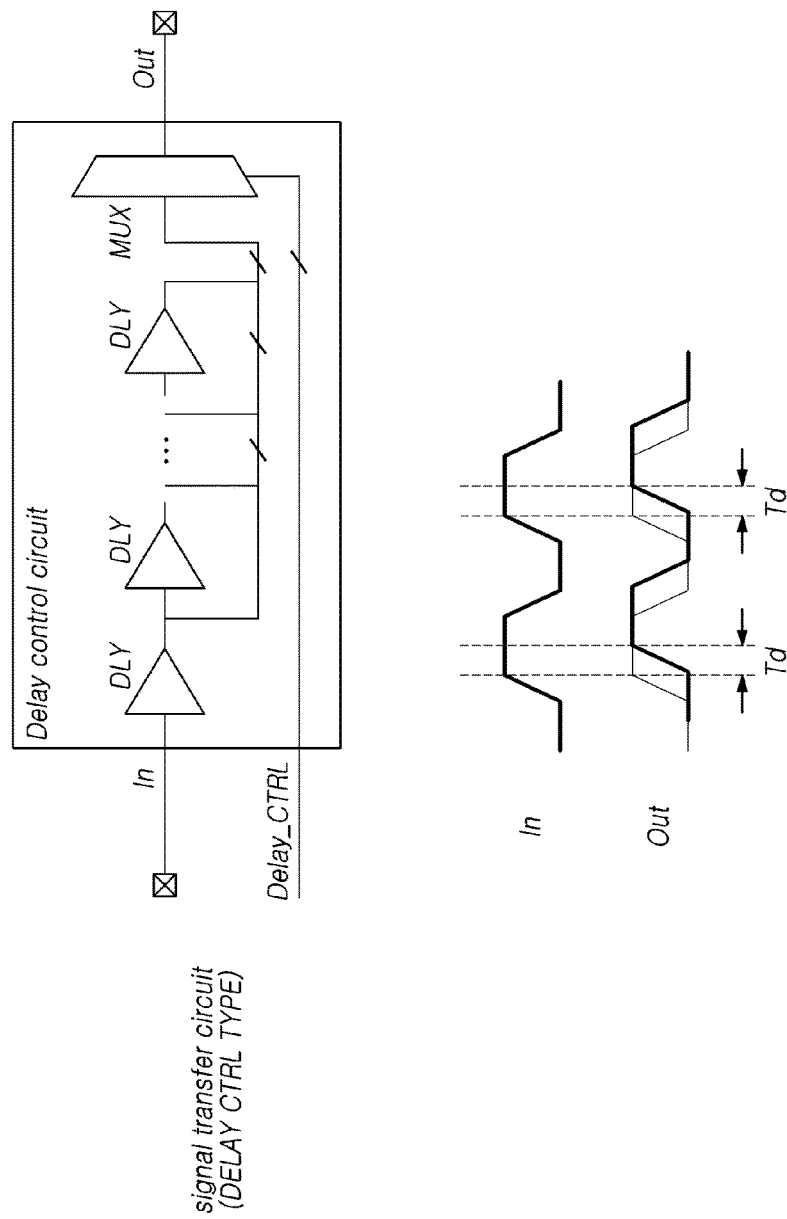

FIGS. 7A and 7B are diagrams illustrating examples of a signal transfer circuit according to an embodiment.

Referring to FIG. 7A, a signal transfer circuit (e.g., signal transfer circuits 102a, 102b, 102c, and 102d of FIG. 1) may be a bypass-type circuit or a buffer-type circuit.

The signal transfer circuit may generate an output signal having substantially the same waveform as that of an input signal. When the impedance of an input unit and that of an output unit need to be isolated, a buffer-type circuit may be applied. Otherwise, a bypass-type circuit may be applied.

Referring to FIG. 7B, a signal transfer circuit (signal transfer circuits 102a, 102b, 102c, and 102d of FIG. 1) may be a delay control circuit (DELAY CTRL TYPE). The delay time of each signal may change depending on the characteristics of an electrode to which a sensor-driving signal and a sensor-driving auxiliary signal are supplied. The delay control circuit may control the delay time of a signal.

In the delay control circuit, a plurality of delay devices (DLY), for example, buffers, may be connected in series, and an output of each delay device (DLY) may be connected to a MUX. According to a delay control signal (Delay_CTRL) input to the MUX, a delay device corresponding to one of the outputs of the delay devices (DLY) is selected. As an output signal (Out) is output by the selected delay device, a predetermined delay time Td may be applied to an output signal (Out) for an input signal (In).

An input signal (In) may have a waveform that repeats based on a predetermined period. Accordingly, when a delay time Td exceeds a period, the phase of an output signal (Out) may appear to be ahead of that of the input signal (In).

The delay control circuit may be applied to the signal transfer circuits 102a, 102b, 102c, and 102d of FIG. 1. Alternatively, although not illustrated in FIG. 1, the delay control circuit may be applied to an input end of a touch-sensing circuit (the touch-sensing circuit 122 of FIG. 1).

Some of the signal transfer circuits (the signal transfer circuits 102a, 102b, 102c, and 102d of FIG. 1) may be buffer-type circuits, as illustrated in FIG. 7A, and some others may be delay control circuits, as illustrated in FIG. 7B. Alternatively, all of the signal transfer circuits (the signal transfer circuits 102a, 102b, 102c, and 102d of FIG. 1) may be buffer-type circuits or delay-control-type circuits.

Figure 8:
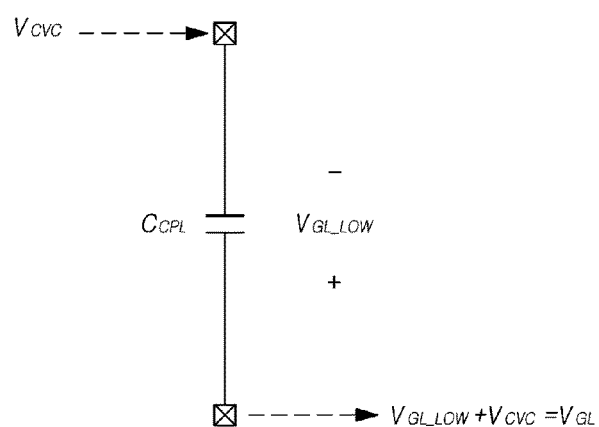
FIG. 8 is a diagram illustrating an example of a coupling circuit according to an embodiment.

FIG. 8 is a diagram illustrating an example of a coupling circuit according to an embodiment.

Referring to FIG. 8, the coupling circuit 140 may include a coupling capacitor $C_{CPL}$. A sensor-driving waveform $V_{CVC}$ may be supplied to one end of the coupling capacitor $C_{CPL}$, and a third sensor-driving auxiliary signal $V_{GL}$ may be generated at the other end. A coupling voltage $V_{GL\_LOW}$ may be formed at both ends of the coupling capacitor $C_{CPL}$.

In a display mode, a gate low voltage $V_{GL\_LOW}$ is supplied to the other end of the coupling capacitor $C_{CPL}$, and the voltage formed at both ends of the coupling capacitor $C_{CPL}$ may be the gate low voltage $V_{GL\_LOW}$. In this instance, only when a ground voltage is supplied to one end of the coupling capacitor $C_{CPL}$ may the voltage formed at both ends of the coupling capacitor $C_{CPL}$ be the gate low voltage $V_{GL\_LOW}$. When a reference voltage VREF is supplied to one end of the coupling capacitor $C_{CPL}$, the coupling voltage may be a voltage corresponding to the difference between the gate low voltage $V_{GL\_LOW}$ and the reference voltage VREF.

In a touch mode, the gate low voltage $V_{GL\_LOW}$ supplied to the other end of the coupling capacitor $C_{CPL}$ is interrupted and the voltage of the other end of the coupling capacitor $C_{CPL}$ is a third sensor-driving auxiliary signal $V_{GL}$ according to a sensor-driving waveform $V_{CVC}$ and a coupling voltage.

Figure 9:
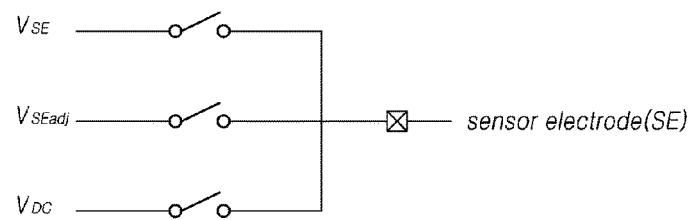
FIG. 9 is a diagram illustrating an example of a touch-driving MUX according to an embodiment.
Figure 10:
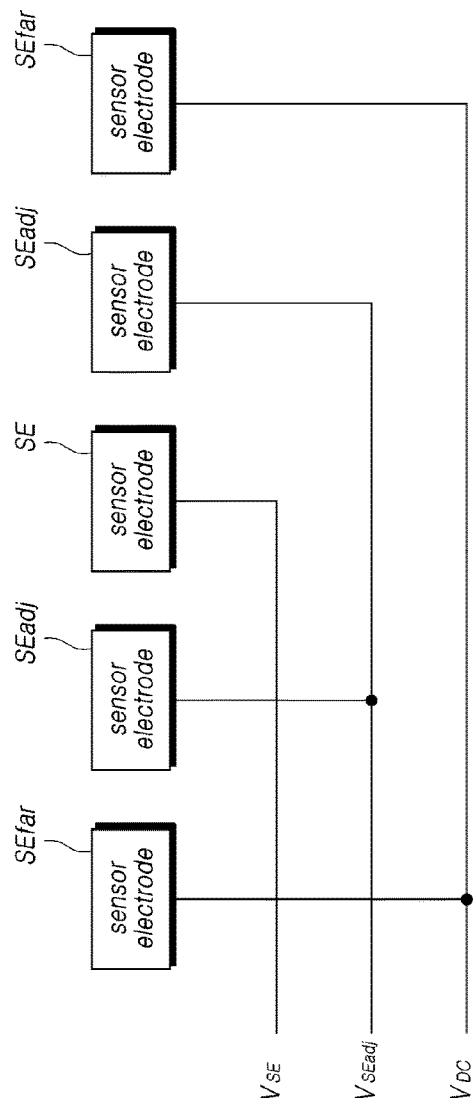
FIG. 10 is a diagram illustrating an example of a signal supplied to a sensor electrode according to an embodiment.

FIG. 9 is a diagram illustrating a touch-driving MUX. FIG. 10 is a diagram illustrating an example of a signal supplied to a sensor electrode according to an embodiment.

Referring to FIG. 9, the touch-driving signal MUX 124 may selectively supply one of a sensor-driving signal $V_{SE}$, a first sensor-driving auxiliary signal $V_{SEadj}$, and a DC voltage $V_{DC}$ to a sensor electrode SE.

Referring to FIG. 10, a sensor-driving signal $V_{SE}$ may be supplied to a first sensor electrode SE with respect to which sensing is performed, and a first sensor-driving auxiliary signal $V_{SEadj}$ may be supplied to a second sensor electrode SEadj that is adjacent to the first sensor electrode SE. A DC voltage $V_{DC}$ may be supplied to a third sensor electrode SEfar that is far from the first sensor electrode SE, and is adjacent to the second sensor electrode SEadj.

The second sensor electrode SEadj adjacent to the first sensor electrode SE with respect to which sensing is to be performed may generate a parasitic capacitor with the first sensor electrode SE, and thus, a first sensor-driving auxiliary signal $V_{SEadj}$ having a phase that is substantially the same as that of a sensor-driving signal $V_{SE}$ may be supplied in order to increase touch sensitivity.

Conventionally, when a sensor-driving auxiliary signal is supplied to the third sensor electrode SEfar that is far from the first sensor electrode SE with respect to which sensing is to be performed, multi-touch or palm-touch performance may be decreased, which is undesirable. Accordingly, a DC voltage $V_{DC}$ may be supplied to the third sensor electrode SEfar.

Figure 11:
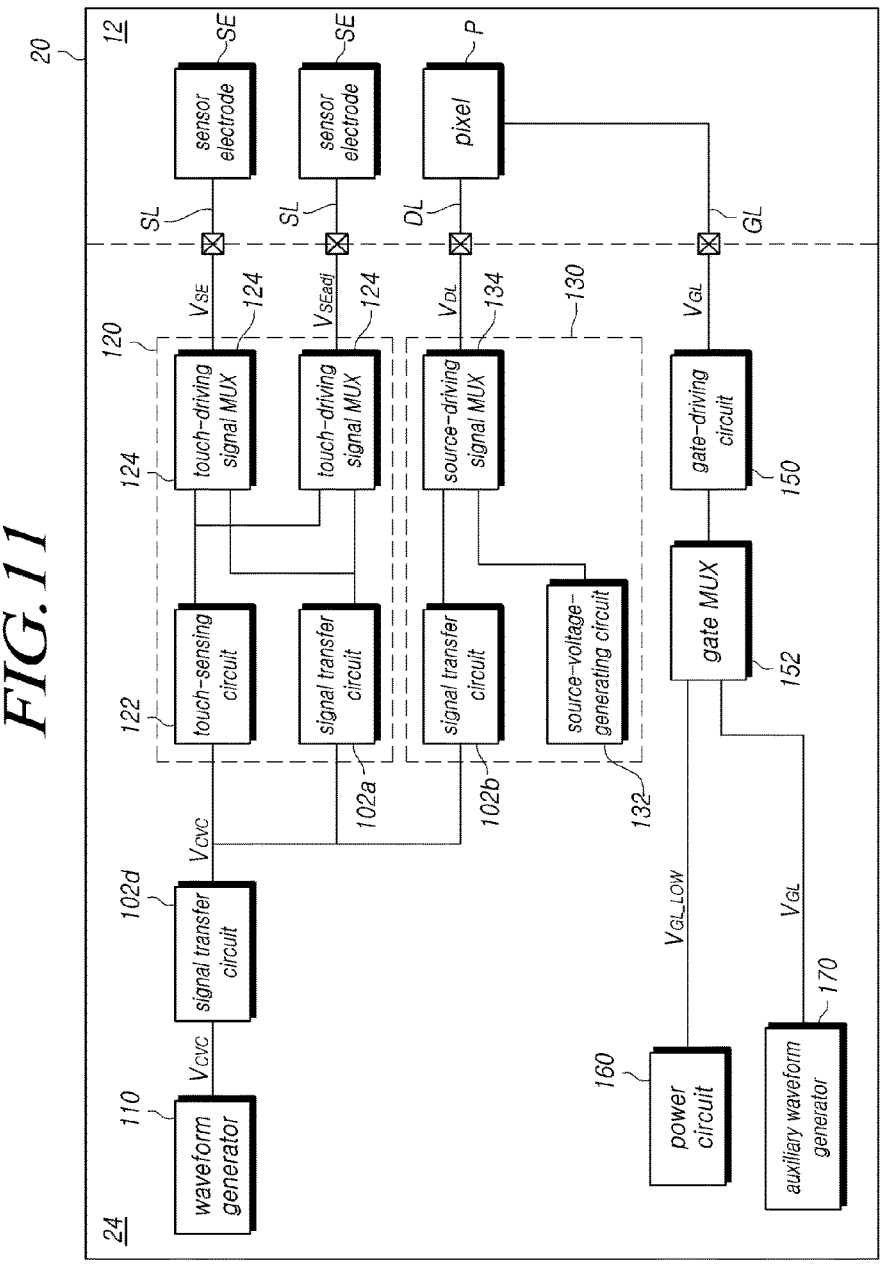
FIG. 11 is a diagram schematically illustrating the configuration of a display device according to another embodiment.

FIG. 11 is a diagram schematically illustrating a display device according to another embodiment.

When compared to the display device 10 according to the embodiment of FIG. 1, the display device 20 according to another embodiment, which is illustrated in FIG. 11, does not include a coupling circuit in a panel-driving device but further includes an auxiliary waveform generator 170 and a gate MUX 152.

According to an embodiment of FIG. 1, an operating voltage of a circuit device related to a gate-driving circuit is different from that of another circuit device. Accordingly, in the panel-driving device, a block related to the gate-driving circuit may be separated from another block through a coupling circuit. In the embodiment, the coupling circuit performs a function that enables a third sensor-driving auxiliary signal, interoperating with a sensor-driving waveform generated by a waveform generator, to be delivered to the gate-driving circuit.

According to the embodiment of FIG. 11, the auxiliary waveform generator 170 and the gate MUX 152 may be further included in a panel-driving device 24 instead of the coupling circuit. As a matter of course, although the coupling circuit can be included in the embodiment of FIG. 11, this is omitted from FIG. 11 for ease of description.

In the display device 20 according to the embodiment, the auxiliary waveform generator 170 generates a third sensor-driving auxiliary signal $V_{GL}$ having a voltage that has a difference of a predetermined voltage from that of a sensor-driving waveform $V_{CVC}$ generated by the waveform generator 110. In this instance, the auxiliary waveform generator 170 may interoperate with the waveform generator 110 based on a signal or according to some timing.

The third sensor-driving auxiliary signal $V_{GL}$ is delivered to the gate-driving circuit 150 through the gate MUX 152, and the gate-driving circuit 150 supplies the third sensor-driving auxiliary signal $V_{GL}$ to a gate line GL.

The gate MUX 152 may receive the third sensor-driving auxiliary signal $V_{GL}$ and a gate low voltage $V_{GL\_LOW}$ generated in the power circuit 160. The gate MUX 152 may selectively output the gate low voltage $V_{GL\_LOW}$ and the third sensor-driving auxiliary signal $V_{GL}$ to the gate-driving circuit 150.

The gate MUX 152 outputs the gate low voltage $V_{GL\_LOW}$ to the gate-driving circuit 150 in a display mode, and outputs the third driving auxiliary signal $V_{GL}$ to the gate-driving circuit 150 in a touch mode.

Although not illustrated in FIG. 11, a signal transfer circuit that has been described with reference to FIGS. 7A and 7B may be disposed between the auxiliary waveform generator 170 and the gate MUX 152. Particularly, a delay control circuit, which has been described with reference to FIG. 7B, may be disposed between the auxiliary waveform generator 170 and the gate MUX 152, and a difference in phase between the waveform generator 110 and the auxiliary waveform generator 170, which is undesirable, may be overcome through the delay control circuit. As an example, the delay control circuit may synchronize the phases of a sensor-driving waveform output from the waveform generator 110 and a third sensor-driving auxiliary signal output from the auxiliary waveform generator 170.

As described above, according to embodiments of the present invention, a sensor-driving auxiliary signal may be supplied to electrodes disposed around a sensor electrode at the same time. Also, according to embodiments of the present invention, a sensor-driving auxiliary signal, which has a voltage level different from that of a sensor-driving signal, may be supplied to circuit devices related to gate driving. Also, according to embodiments of the present invention, the occurrence of electromagnetic interference (EMI) caused by a sensor-driving signal and a sensor-driving auxiliary signal may be minimized.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A panel-driving device for driving a panel including a plurality of pixels, a plurality of data lines, a plurality of gate lines, and a plurality of sensor electrodes, the panel-driving device comprising:
   a waveform generator configured to generate a sensor-driving waveform;
   a touch-driving circuit configured to generate a sensor-driving signal according to the sensor-driving waveform and to supply the sensor-driving signal to at least one sensor electrode, and to generate a first sensor-driving auxiliary signal according to the sensor-driving waveform and to supply the first sensor-driving auxiliary signal to a sensor electrode adjacent to the at least one sensor electrode;
- a data-driving circuit configured to generate a second sensor-driving auxiliary signal according to the sensor-driving waveform and to supply the second sensor-driving auxiliary signal to a data line; and
- a coupling circuit configured to generate a third sensor-driving auxiliary signal of which a voltage has a difference of a coupling voltage from a voltage of the sensor-driving waveform, and to supply the third sensor-driving auxiliary signal to a gate-driving circuit that drives a gate line.

2. The panel-driving device as claimed in claim 1, further comprising:
- a buffer circuit configured to receive the sensor-driving waveform as an input and to output the second sensor-driving auxiliary signal.

3. The panel-driving device as claimed in claim 1, wherein the touch-driving circuit includes a multiplexor (MUX) for selectively outputting the sensor-driving signal, the first sensor-driving auxiliary signal, and a direct current (DC) voltage.

4. The panel-driving device as claimed in claim 3, wherein the touch-driving circuit is configured to: supply the sensor-driving signal to a first sensor electrode; supply the first sensor-driving auxiliary signal to a second sensor electrode adjacent to the first sensor electrode; and supply the DC voltage to a third sensor electrode that is adjacent to the second sensor electrode and is far from the first sensor electrode.

5. The panel-driving device as claimed in claim 1, wherein the coupling circuit includes a coupling capacitor, to one end of which the sensor-driving waveform is supplied, in a remaining end of which the third sensor-driving auxiliary signal is generated, and in which a voltage formed at both ends is the coupling voltage.

6. The panel-driving device as claimed in claim 5, further comprising:
- a switch configured to connect the remaining end of the coupling capacitor and a gate low voltage source for releasing a connection between the data line and a pixel in a display mode, and to release the connection between the remaining end and the gate low voltage source in a touch mode.

7. The panel-driving device as claimed in claim 1, wherein the sensor-driving waveform is a trapezoid waveform.

8. The panel-driving device as claimed in claim 1, wherein the sensor-driving waveform changes to a first level voltage and a second level voltage, and a voltage variation rate per unit time is a constant value when the sensor-driving waveform is changed from the first level voltage to the second level voltage.

9. The panel-driving device as claimed in claim 1, wherein the waveform generator comprises an output capacitor, a first current source for supplying a current to the output capacitor, and a second current source for sinking a current from the output capacitor, and is configured to:
- generate the sensor-driving waveform by raising a voltage of the output capacitor using the second current source for a first time duration, maintain the voltage of the output capacitor for a second time duration, and lower the voltage of the output capacitor using the first current source for a third time duration.

10. The panel-driving device as claimed in claim 9, wherein the waveform generator is configured to control a magnitude of an input/output current of the first current source and the second current source in order to control a slopes of a rising edge and a falling edge of the sensor-driving waveform.

11. The panel-driving device as claimed in claim 9, wherein the waveform generator is configured to control lengths of the first time duration and the third time duration in order to control a magnitude of a voltage variation of the sensor-driving waveform.

12. The panel-driving device as claimed in claim 9, wherein the waveform generator is configured to control a capacitance of the output capacitor in order to control slopes of a rising edge and a falling edge of the sensor-driving waveform.

13. The panel-driving device as claimed in claim 9, wherein the output capacitor is connected between a negative input device of an amplifier to an output device, and
- the first current source and the second current source are connected to the negative input device of the amplifier via respective switches.

14. The panel-driving device as claimed in claim 13, wherein the waveform generator is configured to control an on time of the switch in order to control a magnitude of a voltage variation of the sensor-driving waveform.

* * * * *